(12) United States Patent
Suvakovic et al.

(10) Patent No.: US 8,259,944 B2
(45) Date of Patent: Sep. 4, 2012

(54) SYSTEM AND METHOD FOR PATHOLOGICAL PATTERN PROTECTION

(75) Inventors: Dusan Suvakovic, Marina del Rey, CA (US); Glenn M. Boles, Fords, NJ (US)

(73) Assignee: Alcatel Lucent, Paris (FR)

( * ) Notice: Subject to any disclaimer, the term of this patent is extended or adjusted under 35 U.S.C. 154(b) by 740 days.

(21) Appl. No.: 12/214,051

(22) Filed: Jun. 16, 2008

(65) Prior Publication Data
US 2009/0313697 A1    Dec. 17, 2009

(51) Int. Cl.
*G06F 11/08* (2006.01)
*G06F 11/16* (2006.01)
(52) U.S. Cl. .......................................... 380/268; 726/22
(58) Field of Classification Search .................. None
See application file for complete search history.

(56) References Cited

U.S. PATENT DOCUMENTS

| | | | | |
|---|---|---|---|---|
| 5,276,709 A | * | 1/1994 | Kazawa et al. | 375/242 |
| 5,400,334 A | * | 3/1995 | Hayssen | 370/245 |
| 5,852,805 A | * | 12/1998 | Hiratsuka et al. | 704/500 |
| 5,923,653 A | * | 7/1999 | Denton | 370/375 |
| 6,952,480 B1 | * | 10/2005 | Martin | 380/261 |
| 2005/0013438 A1 | * | 1/2005 | Nicolai | 380/268 |
| 2007/0061665 A1 | * | 3/2007 | Cranford et al. | 714/752 |
| 2007/0195905 A1 | * | 8/2007 | Schatz | 375/265 |

OTHER PUBLICATIONS

Rothenstein. Transporting SDI and HD-SDI with MRV Communications' SFP. Jun. 1, 2006.*

* cited by examiner

*Primary Examiner* — Venkat Perungavoor
(74) *Attorney, Agent, or Firm* — RG & Associates (57) ABSTRACT

In a frame synchronous scrambled communications network, communications are protected from pathological bit patterns that may lead to loss of receiver lock by detecting a pathological bit pattern in an incoming traffic stream using a pathological pattern detector. When a pathological bit pattern, such as a transition-less bit pattern, is detected, a corrective bit pattern is generated and inserted or substituted into the incoming traffic stream before transmission to the receiver. The receiver can be configured to revert the modified traffic stream back to the original traffic stream.

14 Claims, 7 Drawing Sheets

SYSTEM AND METHOD FOR PATHOLOGICAL PATTERN PROTECTION

FIELD OF THE INVENTION

This application relates to protection of communications from undesirable bit patterns and in particular to the protection of telecommunications in systems that use frame synchronous scrambling.

BACKGROUND OF THE INVENTION

Scrambling is a method for line coding, widely used in standard optical, wireline and wireless communication systems. Scrambled data patterns typically feature approximately equal number of logic "ones" and "zeros", thus ensuring proper biasing of the line drivers and receivers. Additionally, scrambled line code maintains sufficient rate of bit transitions necessary to keep the receiver in lock and enable reliable clock recovery.

The three scrambling methods used in various communication standards are Frame-Synchronous Scrambling (FSS), Self-Synchronous Scrambling (SSS) and Distributed Sample Scrambling [ref]. Frame-synchronous scrambling (FSS), to which the present disclosure is directed, is used in major data communications standards such as the family of Synchronous Optical NETwork (SONET) standards published by American National Standards Institute (ANSI) and International Telecommunications Union (ITU), Broadband Passive Optical Networks (BPON) ITU-T G.983, Gigabit-capable Passive Optical Networks (GPON) ITU-T G.984, Wireless Local Area Network (WLAN) IEEE 802.11 etc. Frame-synchronous scrambling is implemented in the transmitter unit by performing the bitwise exclusive XOR operation between the outgoing data bit stream and the cyclically repeatable scrambler sequence. FSS is popular because its implementation is simple and because bit errors in the received signal are not multiplied by the FSS descrambler. However, FSS is susceptible to "pathological" bit patterns, i.e. undesirable bit patterns that happen to match the scrambler sequence, which can result in long sequences of all-zero or all-one bits in the scrambled signal. Transmission of such sequences causes clock and data recovery failure and unlocking of the receiver (s), leading to heavy packet loss. The pathological patterns may either be created accidentally, or deliberately by a malicious attacker aiming to impair the network traffic. The probability of occurrence of pathological data patterns is higher for shorter scrambler sequences.

This issue has become particularly critical in the emerging access technology known as passive optical networks (PON), due to their high exposure to individual users. Particularly affected are PON standards BPON and GPON standards which utilize scrambler sequences of only 127 bits. To compensate for the standard's vulnerability to attack due to the described FSS weakness, the ITU-T standard G.984 (GPON) recommends the use of encryption of all downstream unicast traffic. However, this measure provides only partial protection from attacks since it is not applicable to GPON multicast traffic, which cannot be encrypted.

What is required is a system and method for protecting communications against pathological bit patterns in a communications system using frame-synchronous scrambling.

SUMMARY OF THE INVENTION

In one aspect of the disclosure, there is provided a system for protection against pathological patterns in a Frame Synchronous Scrambled network communication. In the system, at least one transmitter comprises at least one pathological pattern detector that detects one or more undesirable bit patterns in an incoming traffic stream, and at least one bit pattern modification module that modifies the one or more undesirable bit patterns to produce a modified traffic stream. The transmitter transmits the modified traffic stream.

In one aspect of the disclosure, there is provided a method for correcting pathological patterns in a Frame Synchronous Scrambled network communication. The method comprises receiving an incoming traffic stream, detecting an undesirable bit pattern in the incoming traffic stream, and modifying the undesirable bit pattern to produce a modified traffic stream.

In one aspect of the disclosure, there is provided a telecommunications system. A transmitter comprises a frame synchronous scrambler that scrambles an incoming traffic stream, a pattern detector that detects one or more undesirable bit patterns in a scrambled traffic stream, and a bit pattern modification module that modifies the one or more undesirable bit patterns to produce a modified traffic stream. A receiver receives the modified traffic stream and reverts the modified traffic stream.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1A:
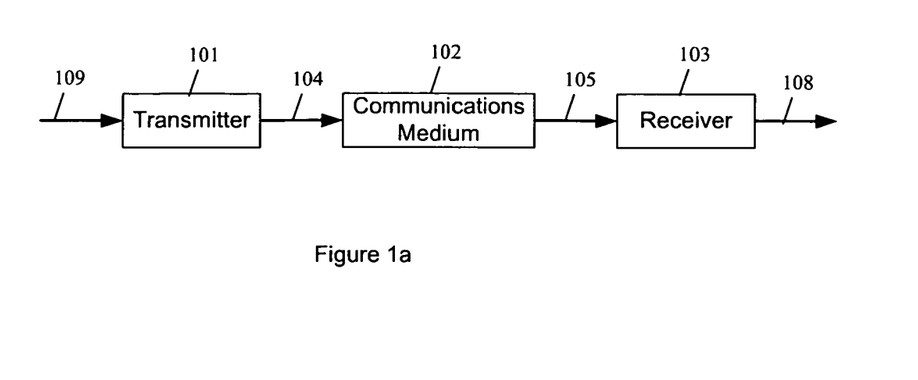
FIG. 1A shows a generic digital communication network.

FIG. 1A shows an illustrative communications network having a transmitter 101, a communication medium 102, and a receiver 103, connected as shown in the FIG. 1. Data 104 is output by the transmitter 101 into the communication medium 102 and is carried by medium 102 to receiver 103 as the receiver input data stream 105. The receiver 103 decodes and processes input data stream 105 to produce output 108. The direction of flow of the data stream is not of particular relevance and may be, for example, from network provider to end user, from end user to network provider, between network providers, etc.

Figure 1B:
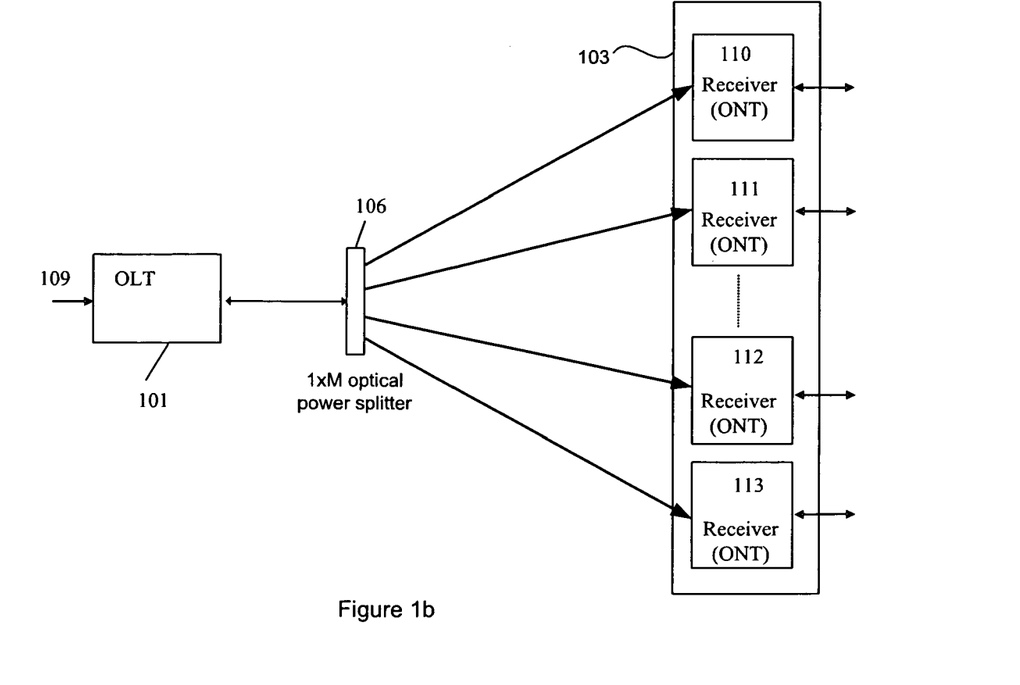
FIG. 1B shows a passive optical network as an example of the network shown in FIG. 1A.

FIG. 1B shows a more specific illustrative communications network, namely a passive optical communication network (PON) having multiple user receiver nodes 110-113, within a group of receivers 103, receiving data from a central office node 101. While a PON is one representative example, one skilled in the art will recognize that the principles of the present invention may be applied to any network with one or more user nodes, employing frame synchronous scrambling (FSS). Referring to FIG. 1B, receiver nodes 110-113 are connected by optical fiber link 102 to central office node 101 through illustrative optical power splitter 106. It will be apparent to one skilled in the art that other suitable communications mediums, such as electrical wires, are equally advantageous.

Figure 2:
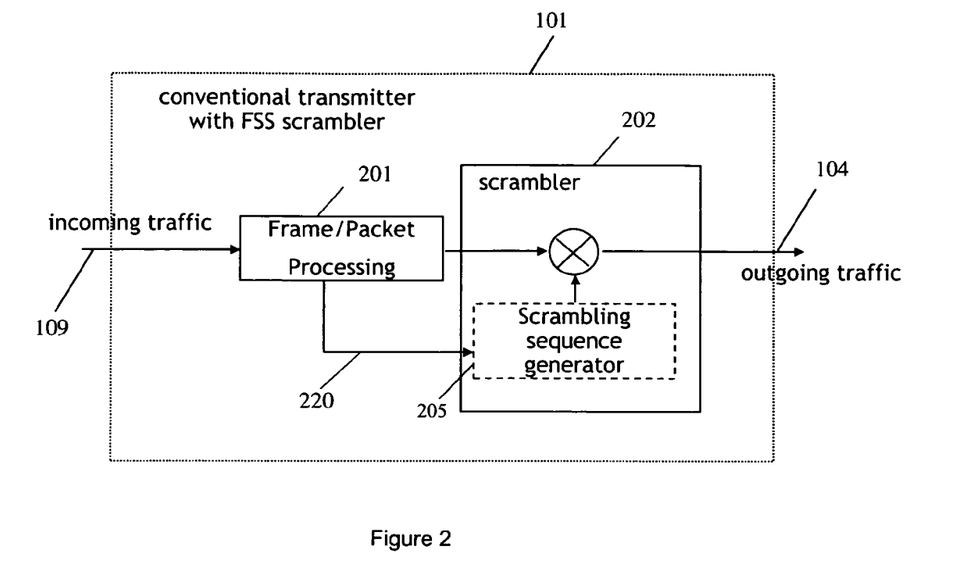
FIG. 2 shows the components of a prior-art transmitter shown in FIG. 1A and FIG. 1B.

FIG. 2 shows the components and structure of a typical prior-art transmitter. Generally, incoming traffic arriving at port 109 is processed by the frame processing module 201 and subsequently scrambled by the frame synchronous scrambler module 202, in order to be transmitted at port 104. Module 201 initializes the scrambling sequence generator 205 by activating the synchronization signal 220.

Figure 6:
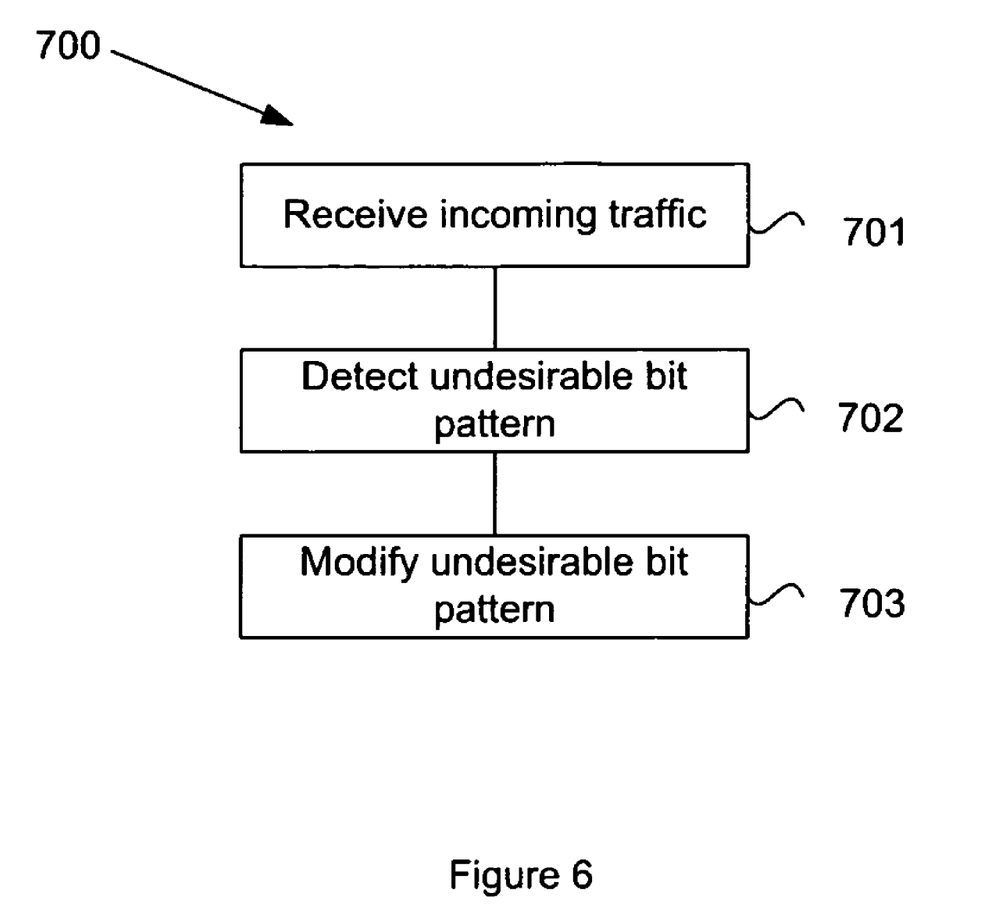
FIG. 6 provides a flowchart of a method for correcting pathological patterns.

As described previously, a problem with typical networks employing frame-synchronous scrambling is that they may be subject to pathological patterns in the incoming traffic stream. To combat these undesirable or pathological patterns, the transmitter may be modified to include a bit pattern modification module that can reduce or eliminate the negative impact of pathological bit patterns by modifying the bit patterns of the output traffic from the transmitter. Using the bit pattern modification module, a method may be performed as illustrated in the flowchart 700 of FIG. 6. At step 701, a transmitter receives an incoming traffic stream. At step 702, an undesirable bit pattern is detected in the incoming traffic stream and is modified (step 703) to produce a modified traffic stream. In various embodiments, modifying of the output traffic may be performed by replacement, insertion, or a combination of replacement and insertion methods.

Figure 3A:
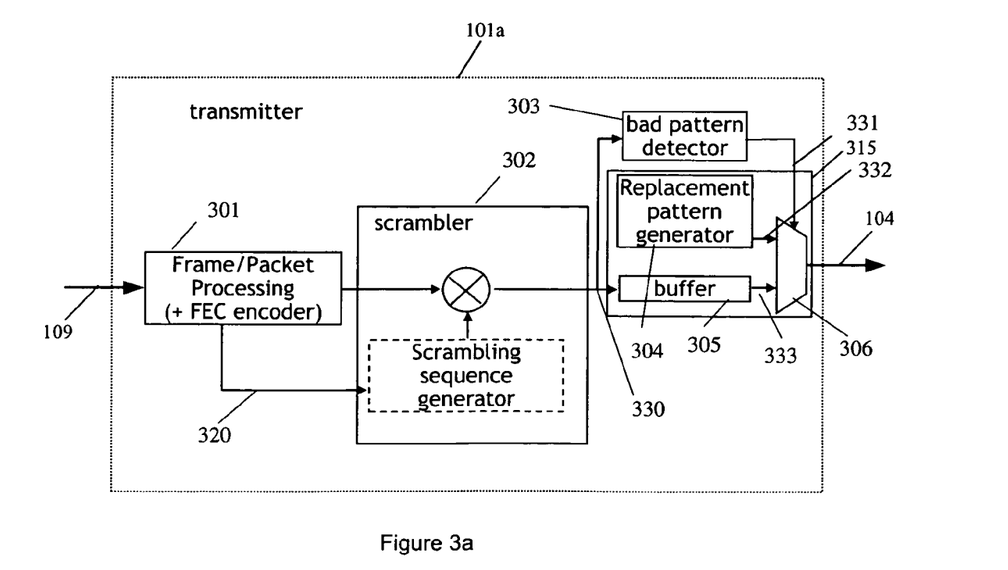
FIG. 3A shows a transmitter in accordance with an embodiment of the disclosure.

FIG. 3A shows the components and structure of the transmitter of FIG. 2 modified in accordance with an embodiment of the disclosure. The transmitter 101*a* is hardware capable of intercepting pathological patterns in the transmitted data payload and replacing the resulting all-one (or all-zero) output signal with a locally generated pattern that prevents receiver unlocking.

The transmitter 101*a* differs from the transmitter 101 shown in FIG. 2, in that it performs additional processing on the data stream coming out of the scrambler 302. This processing logic includes additional modules: a bit pattern modification module 315 and a bad pattern detector 303. The bit pattern modification module 315 includes a first-in first-out (FIFO) buffer 305, a replacement pattern generator 304 and a multiplexer 306 that receives inputs from the buffer 305 and the replacement pattern generator 304. Scrambler output data 330 enters the FIFO buffer 305. During normal operation, the multiplexer 306 passes the FIFO buffer output 333 to the transmitter output 104. The bad pattern detector 303 is continuously checking whether data 330 contains a contiguous bit sequence without bit transitions (i.e. a bit sequence consisting of all logic "ones" or all logic "zeros") that is longer than the maximum length of such sequences specified by the relevant standard. In one embodiment, an undesirable pattern may occur if the maximum length for the transition-less transmitted bit sequence exceeds the maximum time without bit transitions that the receiver clock and data recovery (CDR) circuits can endure without losing their lock to the transmission clock. Upon detection of an undesirable pattern, here also referred to as a bad pattern, the bad pattern detector 303 issues a start command to the replacement pattern generator 304 and switches the multiplexer select input 331 to pass the pattern generator output 332 to the transmitter output 104. The multiplexer stays in this state for the duration of the replacement pattern, after which it is switched back to the normal operation state which transmits the output of the buffer 305. While the replacement pattern is being transmitted, the incoming data is being put through the frame/packet processing module 301, scrambler 302 and the FIFO buffer 305, without interruption. This effectively causes some of the payload data, including at least part of the pathological bit sequence, to be dropped and replaced by the replacement bit pattern, at the transmitter output 104. The number of bits being transmitted at the output port 104 remains the same as the number of bits received at the input port 109.

In one embodiment, the replacement pattern output by replacement pattern generator 304 is very short and may consist of a single bit or a few bits, e.g. 5 bits of less. Short replacement patterns are beneficial because they can be corrected by forward error correction (FEC) logic that may be part of the transmitter and receiver packet processing blocks.

In one embodiment, the replacement pattern may be applied only to a part of the bit sequence without transition, which makes it possible for the receiver to revert the replacement pattern, as will be described below.

In one embodiment, the replacement pattern may be placed into the output bit sequence after a shorter period without bit transition at the scrambler output 330 if this period is a contiguous extension of another (longer) period without bit transition. Such pattern replacement behavior is beneficial because it provides better assurance for keeping the receiver (s) in the locked state.

Figure 3B:
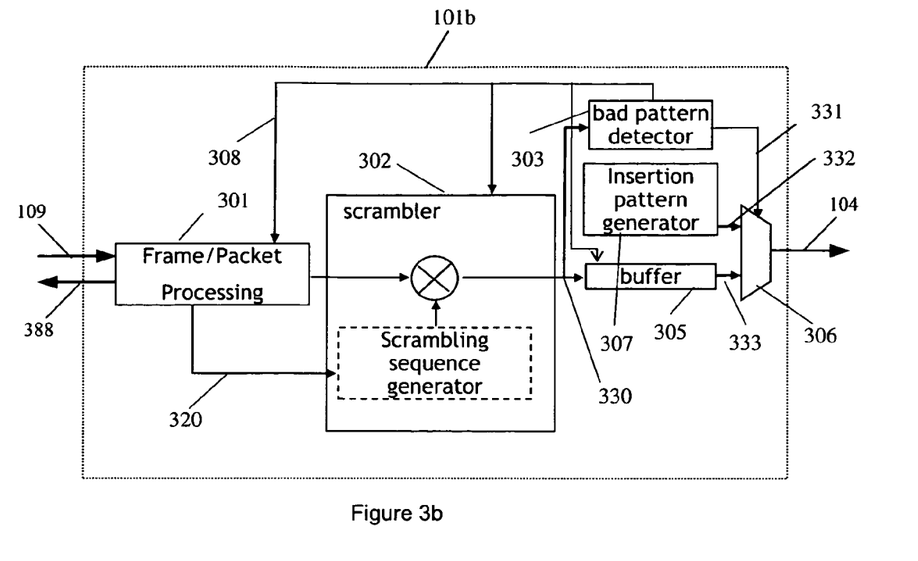
FIG. 3B shows a transmitter in accordance with an alternative embodiment of the disclosure.

FIG. 3B shows the components and structure of a transmitter 101*b* used in an alternative embodiment of the disclosure. The transmitter 101*b* differs from the transmitter 101*a* shown in FIG. 3*a* in that it inserts a locally generated pattern into the output bit stream, without replacing or dropping any of the original data content. This is achieved by stalling the data pipe consisting of modules 301, 302 and 305, while the inserted pattern is being transmitted from an insertion pattern generator 307. As shown in FIG. 3B, the bad pattern detector 303 issues a "backpressure" signal 308 to modules 301, 302 and 305. Stalling the transmitter data pipe may also necessitate the transmitter's assertion of a "backpressure" signal to the external communication entity driving the incoming traffic 109. Such external "backpressure" signal 388 may be driven by the Frame/Packet Processing module 301. Alternatively or in addition, module 301 may or may not include an elastic buffer. Multiplexer 306, controlled by bad pattern detector 303 passes the output of insertion pattern generator 307 to the output port 104 while the insertion pattern is being generated. At all other times, the multiplexer passes the output of the FIFO buffer 305.

The transmitter 101*b* is thus hardware capable of intercepting pathological data patterns and inserting a locally generated pattern that prevents receiver unlocking, after which the transmission of the scrambled payload is continued without the loss of data. As will be described below, the receiver hardware may be augmented to detect and remove the insertion patterns, thus enabling correct reception of the data payload.

To avoid potential data corruption in the receiver caused by the receiver removing a valid sequence of payload bits that happen to be identical to the insertion pattern, the bad pattern detector 303 in FIG. 3B is also capable of detecting the insertion pattern in the scrambler output 330. Upon detection of the insertion pattern, the bad pattern detector 303 will initiate generation and insertion of another copy of the same insertion pattern, at the output port 104, adjacent or immediately preceding the detected pattern. Generally, for every group of N back-to-back bit patterns identical to the insertion pattern in the bit stream 330, module 303 will initiate the insertion of a single additional insertion pattern immediately preceding the said group, at the output port 104. As will be described below, a matching receiver may be configured to remove only one insertion pattern from a group of N+1 back-to-back insertion patterns, thus restoring the original bit sequence.

In a further embodiment of the disclosure, the transmitter may be augmented by a management unit that decides between replacing and inserting the locally generated pattern upon detection of a pathological pattern in the data payload. The choice is based on the estimate made by the management unit as to whether the pathological pattern was generated accidentally or deliberately. When the occurrence of the pathological pattern is considered to be accidental, the pre-defined locally generated insertion pattern is inserted in the scrambled bit stream, thus preventing the loss of data at the expense of slightly reduced bandwidth efficiency. Conversely, when the pathological pattern is deemed to be a deliberate attack on the network, it is replaced in the scrambled bit stream with a pre-defined replacement pattern, without consuming additional bandwidth.

Figure 3C:
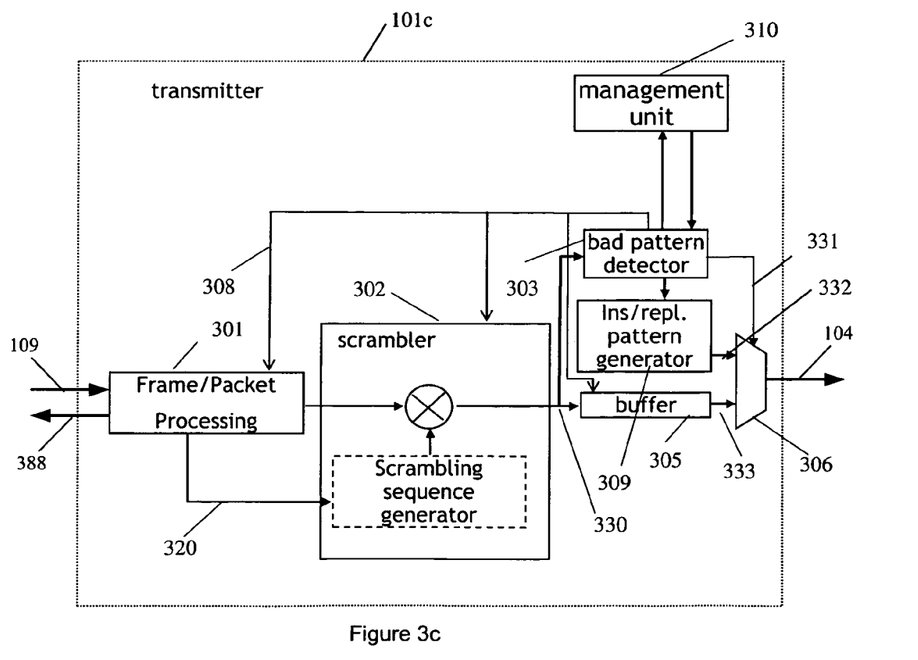
FIG. 3C shows a transmitter in accordance with an alternative embodiment of the disclosure.

An example of an augmented transmitter 101*c* is illustrated in FIG. 3C. In the transmitter 101*c* the operation of modules 301, 302, 305 and 306 is the same as described above for FIG. 3B. The transmitter shown in FIG. 3C, includes a correction management unit 310. The management unit 310 receives identification information associated with the currently transmitted packet, from unit 301. It also receives information about the detection of pathological bit patterns from module 303. Based on these inputs, previously collected information about occurrences of the pathological patterns associated with the same packet identification and the currently applicable policy, the correction management unit 310 decides whether correction of an undesirable bit pattern should be by way of insertion or replacement of a corrective bit pattern. The correction management unit 310 communicates the decision to an insertion/replacement pattern generator 309 that generates the correction pattern. The policy may be specified by the network operator and programmed into the management unit 310. This functionality is beneficial for the network performance because it allows the network operator to identify packets that are likely to be generated for the purpose of an attack on the network and replace their parts with a locally generated pattern without incurring any bandwidth penalty. Conversely, if a packet containing a pathological bit pattern is not identified as being sent by an attacker, the occurrence of the pathological pattern is considered to be accidental and the insertion/replacement pattern generator 309 performs pattern insertion rather than replacement. This way, the corruption of the packet is avoided, making it possible for a receiver to recover the original packet data, as will be described below. The locally generated patterns for insertion and replacement may be different, such that at least the former one can be recognized and extracted by the receiver. However, it is clear that applying the same pattern in both cases is equally beneficial.

When insertion is chosen by the management unit 310, a backpressure signal 308 may be generated as described previously and provided to the frame processing module 301, the scrambler 302 and the buffer 305. In addition, a backpressure signal 388 may be provided to the external communication entity driving the incoming traffic 109.

In another embodiment, a source of the attack can be identified. When a replacement pattern has been inserted a cell/gem header of the data unit that contained the pathological pattern can be recorded. This information can be given to the host processor for further processing. In essence, the management unit would keep track of the source addresses of packets containing pathological patterns. If one source address appeared multiple times within a defined time window, it would consider this as an attack and filter out all packets coming from the same source, instead of forwarding them to the receiver.

In each of the embodiments described above, the bad pattern detector 303 shown in FIGS. 3A, 3B and 3C may be capable of changing the definition of a bad pattern dynamically. For example, a bad pattern may be initially defined as 80 consecutive "zero" bits. A sequence of 400 consecutive "zeros" may appear at the scrambler output 330. The first bad pattern detection will take place once the first 80 (out of 400) bits are detected and a replacement or insertion pattern will be applied, depending on the chosen method. However, those skilled in the art will recognize that due to the nature of phase locked loops (PLL) used as part of the receiver Clock and Data Recovery (CDR), application of five replacement/insertion patterns 80 bits apart in a 400 zero bit pattern may not be frequent enough to keep the PLL locked. In other words, the 80 bit bad pattern definition may be good enough to save the PLL from unlocking once, but not several times in a row. Therefore, to keep the PLL locked in the case when the zero pattern is prolonged beyond 80 bits, the next bad pattern detection will occur, for example, after the following 60 bits, and the next one after the following 40 bits etc. From the point of view of the bad pattern detector, this means that its definition of the bad pattern can be changed dynamically. This definition is reset to the initial value (80 bits in this example) once a specified number of bit transitions is detected at the scrambler output 330.

Figure 4:
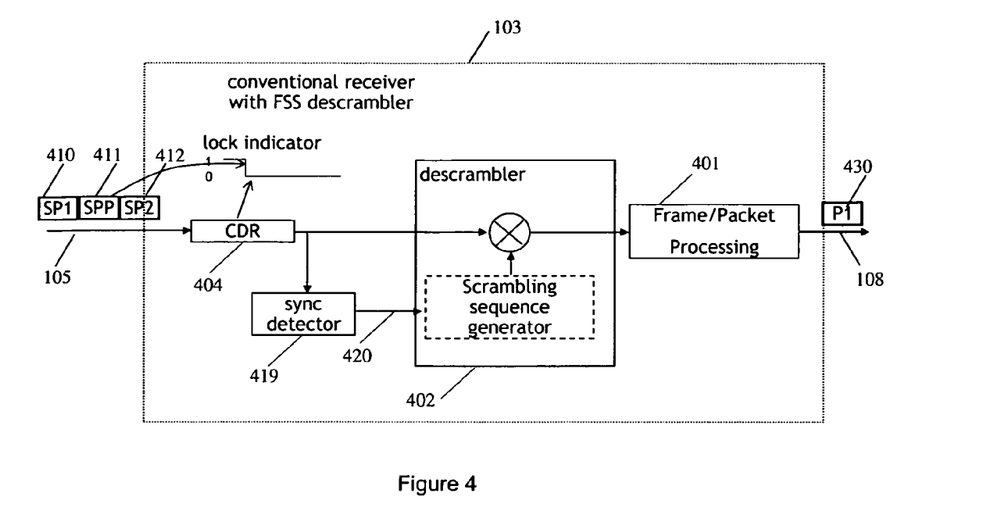
FIG. 4 shows the components of a prior-art receiver shown in FIG. 1A and FIG. 1B and its operation when connected to the prior-art transmitter shown in FIG. 2.

FIG. 4 shows a conventional receiver 103, with a FSS descrambler 402. The receiver 103 includes a clock and data recovery (CDR) unit 404 that receives incoming traffic 105 from the transmitter. The traffic is clocked and then descrambled by descrambler 402 using a synchronization signal 420 from synch detector 419 and a scrambling sequence generator 405.

FIG. 4 also illustrates the behavior of the conventional receiver upon reception of a bit stream containing an excessively long sequence without bit transitions, resulting from the existence of a pathological pattern in one of the transmitted packets. This packet, identified as SPP 411 is sent in a scrambled sequence following "good packet" SP1 410 and preceding another "good packet" SP2 412. Such data pattern may be transmitted by a conventional transmitter such as the one shown in FIG. 2. Packet SP1 will be received correctly by the CDR 404, descrambled by module 402, possibly modified by module 401 and transmitted at the receiver output port 108 as packet P1 430. Upon reception of packet SPP, CDR module 404 will fall out of lock. It is known to those skilled in the art that unlocking of a CDR module involves unlocking of a PLL, which is part of the CDR and that PLLs, once unlocked, generally take a long time to reacquire lock. As a result, one or more packets following SPP will be lost. This is illustrated in FIG. 4, where no packets are transmitted at port 108 after P1.

Figure 5A:
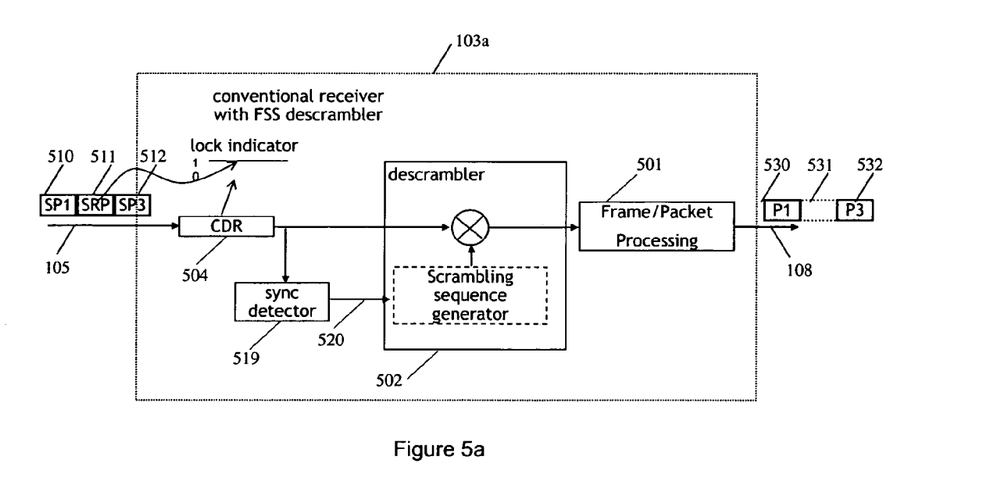
FIG. 5A shows a receiver and its operation when connected to the transmitter shown in FIG. 3A.

FIG. 5A illustrates the behavior of a receiver 103*a* identical to the one shown in FIG. 4, where like reference numerals indicate like components, when receiving data from the transmitter shown in FIG. 3A. As explained above, the transmitter shown in FIG. 3A prevents a long sequence without bit transitions to be transmitted at its output port, by replacing some of the bits of such a sequence with a locally generated pattern that contains bit transitions. Packet SRP 511 in FIG. 5A, represents the scrambled packet SPP 411 of FIG. 4, modified to include the replacement pattern of replacement pattern generator 304. Packets SP1 510 and SP3 512 in FIG. 5A are identical to packets SP1 410 and packet SP3 of FIG. 4, respectively. Due to the sufficient rate of bit transitions in packets SP1, SRP and SP3 in FIG. 5A, the CDR 504 will stay locked while receiving the sequence of these three packets, which is illustrated by the lock indicator signal staying in the logic '1' state. Upon descrambling and frame/packet processing by respective modules 502 and 501 in FIG. 5A, descrambled and modified packets SP1 and SP3 will be transmitted at the receiver's output 108 as packets P1 530 and P3 532, respectively. A gap without packets 531 will possibly exist between P1 and P3 because module 502 will identify packet SRP as invalid and drop it from further transmission. Those skilled in the art will recognize that the receiver in FIG. 5A may not be the end receiver with packet processing capability in the particular communication system and may be retransmitting the incoming packets without checking their validity, in which case some other receiver in the same system will perform this operation and drop the invalid packet derived from SRP.

It is clear from the description of operation of the transmitter 101*a* in FIG. 3A, coupled with the receiver 103*a* in FIG. 5A, that the first method outperforms the conventional system consisting of the transmitter 101 of FIG. 2 and receiver 103 of FIG. 4. Whereas the receiver 103 in the conventional system loses its lock and drops a large number of packets due to the existence of pathological scrambled sequences, the receiver 103*a* in the system in FIGS. 3A and 5A never loses lock and drops only those packets that initially contained a pathological sequence.

The implementation of the replacement patterns requires modification only in the transmitter design, but not in the receiver design. This feature is especially beneficial when applied to BPON and GPON standards where downstream transmission is more sensitive to the loss of lock and protection from pathological sequences is insufficient because multicast traffic cannot be encrypted. Given that in GPON and BPON there is a single downstream transmitter, located in the operator's central office, modification of this unit to match the first method is rather inexpensive, compared to the potential costs of replacing the multiple receiver units on customer premises.

Figure 5B:
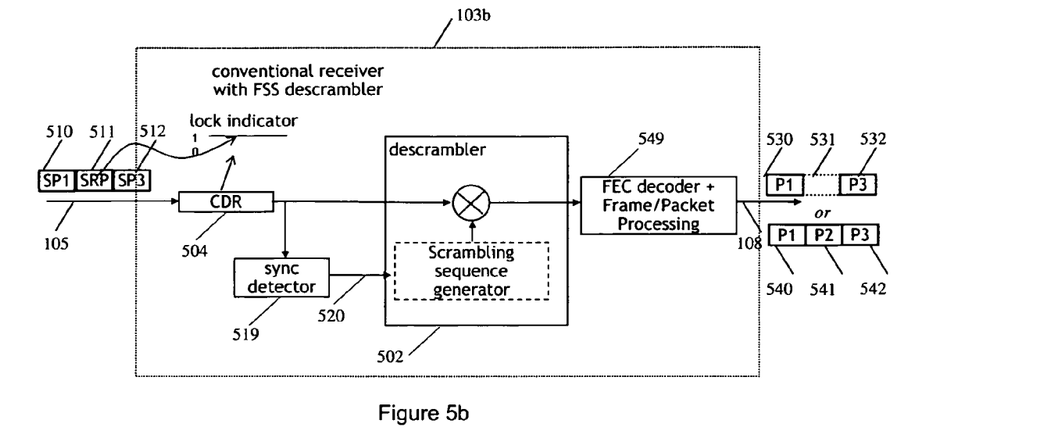
FIG. 5B shows a receiver using forward error correction.

A variant of the receiver that can be used for pathological pattern replacement is shown as receiver 103*b* in FIG. 5B. As is known to those skilled in the art, forward error correction (FEC) is frequently used in communication networks to reduce bit error rate (BER). FEC implementation consists of the FEC encoder, as part of the packet processing block 301 of FIG. 3A, and the matching FEC decoder, as part of the packet processing block 549 of FIG. 5B. If the replacement pattern inserted by the transmitter consists of a single bit or a small number of bits, e.g. less than 5 bits, these bits will be perceived by the receiver's FEC decoder as bit errors caused by channel noise and corrected to their original values. As a result of the correction, the sequence of original packets 540, 541 and 542 will appear at the receiver's output 108. When applied to standards supporting FEC, this embodiment can be implemented without any change to the receiver design, which is beneficial, for example, in GPON.

Figure 5C:
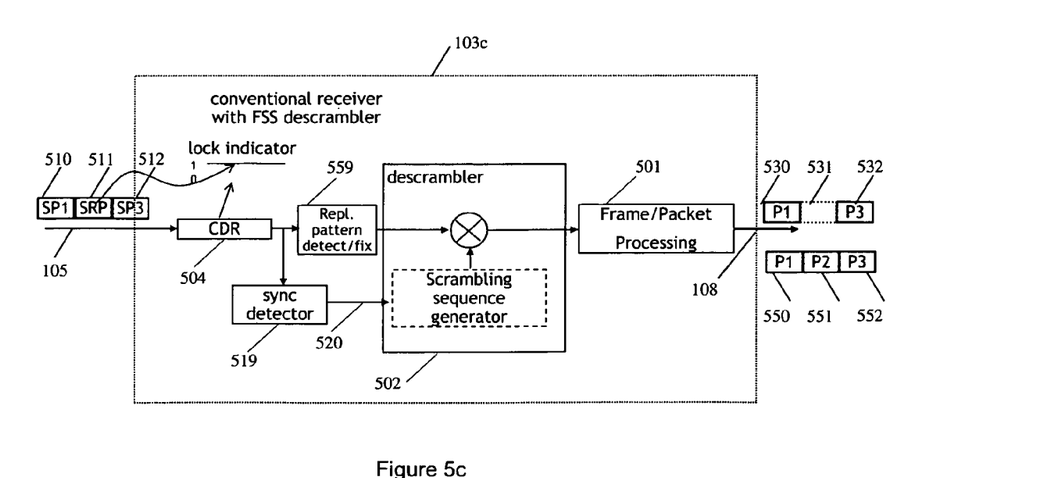
FIG. 5C shows a receiver with replacement pattern detection and removal.

Yet another variant of the receiver that can be used with pathological pattern replacement is shown in FIG. 5C. In this embodiment, the receiver 103*c* includes an additional processing module 559, capable of detecting and reverting the replacement pattern. The logic of the replacement pattern detection module 559 operates on the assumption that a particular bit sequence consisting of a period without transition of a certain known length followed by a known replacement pattern, is the result of bit replacement action by the transmitter shown in FIG. 3A, rather than an accidental occurrence of such pattern without replacement. The probability of this assumption being true is arguably higher than the probability of it being false. Therefore, in the majority of cases, the fully corrected packets 550, 551, and 552 will appear at the receiver's output 108 of FIG. 5C, whereas in the minority of cases, the output packet sequence will look like 530, 531, 532 with the middle packet being dropped.

Figure 5D:
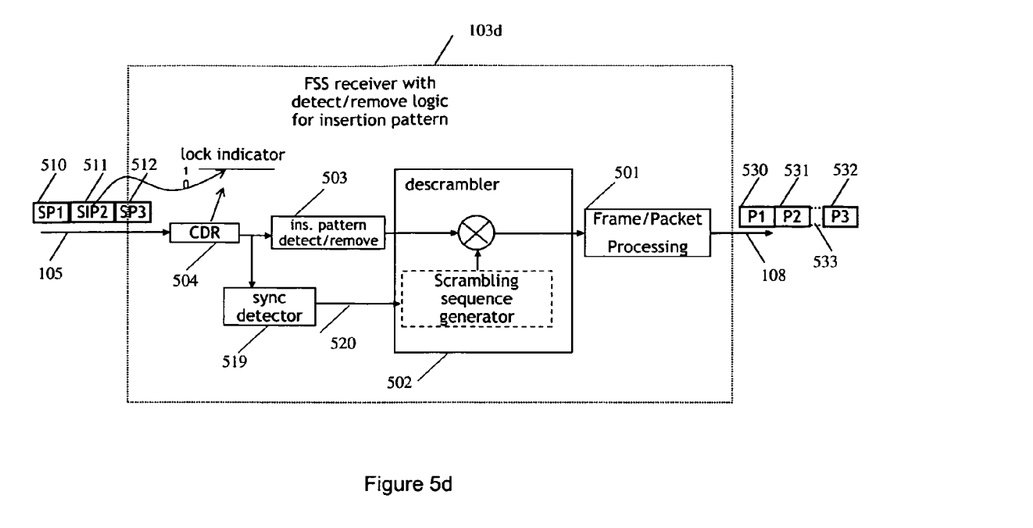
FIG. 5D shows a receiver with insertion pattern detection and removal.

FIG. 5D shows a receiver of FIG. 4 modified for use with the pattern insertion transmitter 101*b* of FIG. 3*b*. The receiver 103*d* is augmented by an additional module 503, the function of which is to detect and remove the insertion pattern from the scrambled input bit stream. The existence of this module makes the receiver compatible with the transmitter 101*b* shown in FIG. 3B. As explained in the description of the transmitter of FIG. 3B, upon reception of N+1 back-to-back insertion patterns, module 503 removes one such pattern, while passing the remaining N patterns to the descrambler. As illustrated in FIG. 5D, the incoming traffic 105 of this receiver may include scrambled packets that contain the pre-defined insertion bit pattern. As explained above, this pattern is inserted by the transmitter of FIG. 3B every time it detects a pathological bit sequence without transitions, at the scrambler output 330. As a result of the combined operation of the transmitter 101*b* and the receiver 103*d*, data transmission without packet loss is achieved. As illustrated in FIG. 5D, packets P1 530, P2 531 and P3 P32, corresponding with the scrambling packets SP1 510, SIP2 511 and SP3 512, will appear at the receiver output port 108. Removal of the insertion pattern will create a small gap in the packet sequence at 108.

The insertion method is beneficial because it provides lossless transmission, ensuring that data packets which, when scrambled, accidentally match a pathological bit sequence, are not dropped. This is achieved at a small bandwidth penalty caused by pattern insertion at the transmitter of FIG. 3B. This method is preferred over the replacement of pathological patterns in all cases that do not involve replacement of the existing equipment, such as the implementation of a new standard.

Figure 5E:
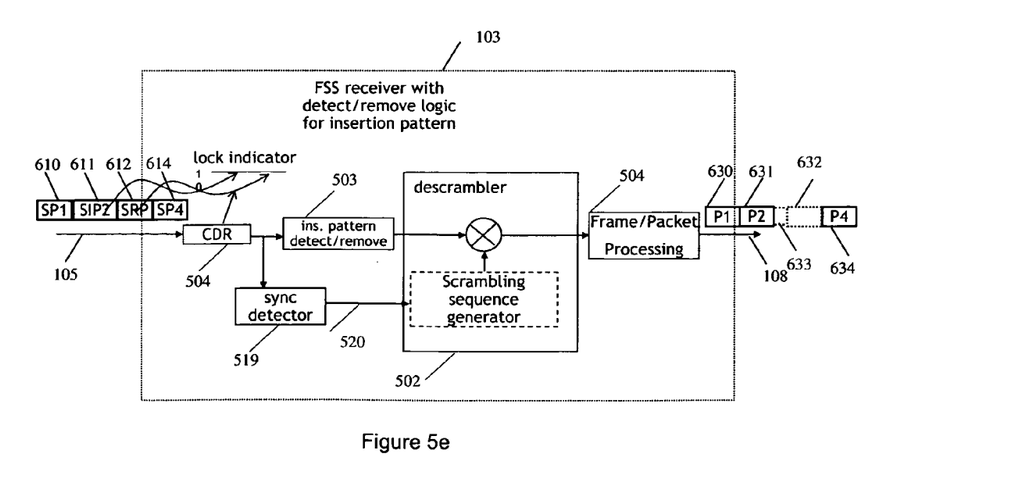
FIG. 5E shows a receiver with insertion pattern detection and removal in an alternative operation.

FIG. 5E shows a receiver 103*e* identical to the one shown in FIG. 5D, but illustrates its operation when connected to the transmitter 101*c* of FIG. 3C. As explained above, the transmitter 101*c* shown in FIG. 3C is capable of deciding whether an occurrence of a pathological bit pattern is accidental or the result of an attack. In cases when it is assumed to be accidental, pattern insertion is applied, whereas in cases when attack is suspected, pattern replacement is applied thus saving bandwidth but corrupting the packet data. As illustrated in FIG. 5E, upon reception of a scrambled packet SIP2 611, containing an insertion pattern, the receiver 101*e* will remove this pattern and process the packet as correct, resulting in the appearance of the processed packet P2 631, followed by the gap 633 caused by pattern removal, at the receiver's output port 108. Upon reception of a scrambled packet SRP 612, corrupted by the replacement pattern, the frame/packet processing module 501 will drop the packet as invalid, resulting in the gap 632 in the output packet sequence. This embodiment is thus advantageous because it allows the system to avoid systematic bandwidth reduction due to pattern insertion when the communication system is exposed to a continuous attack involving deliberately generated pathological bit patterns.

The above described embodiments provide a communications system that makes the network/service more reliable, benefiting the network operator and end customer.

Although embodiments of the present invention have been illustrated in the accompanying drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A system for protection against pathological patterns in a Frame Synchronous Scrambled network communication, the system comprising:
   at least one transmitter comprising:
   at least one pathological pattern detector that detects one or more undesirable bit patterns in an incoming traffic stream; and
   at least one bit pattern modification module that modifies the one or more undesirable bit patterns to produce a modified traffic stream;
   wherein the at least one transmitter transmits the modified traffic stream;
   wherein the at least one bit pattern modification module comprises:
      a replacement pattern generator that generates at least one replacement bit pattern;
      at least one multiplexer that replaces at least a portion of the one or more undesirable bit patterns with the at least one replacement bit pattern;
      an insertion pattern generator that generates at least one insertion pattern; and
      at least one multiplexer that inserts the at least one insertion bit pattern into the one or more undesirable bit patterns of the incoming traffic stream.

2. The system according to claim 1 wherein the at least one replacement bit pattern comprises at least one bit transition pattern.

3. The system according to claim 2 wherein the at least one replacement pattern is less than 5 bits.

4. The system according to claim 1 further comprising at least one receiver that receives the modified traffic stream, the at least one receiver comprising at least one replacement pattern detection module that detects the at least one replacement bit pattern in the modified traffic stream and removes a detected replacement bit pattern from the modified traffic stream.

5. The system according to claim 4 wherein the at least one replacement pattern detection module removes a replacement bit pattern if the replacement bit pattern falls within a bit pattern having no bit transitions for a predetermined number of bits.

6. The system according to claim 1 wherein the at least one replacement bit pattern comprises at least one bit transition pattern.

7. The system according to claim 1 wherein the at least one pathological pattern detector outputs a stalling signal when an undesirable bit pattern is detected to stall the incoming traffic stream.

8. The system according to claim 1 wherein the at least one pathological pattern detector detects the at least one insertion pattern in the incoming traffic stream and wherein the bit pattern modification module inserts the at least one insertion pattern adjacent the detected insertion pattern.

9. The system according to claim 1 further comprising at least one receiver that receives the modified traffic stream, the at least one receiver comprising at least one insertion pattern detection module that detects the at least one insertion bit pattern in the modified traffic stream and removes a detected insertion bit pattern from the modified traffic stream.

10. The system according to claim 1 wherein the at least one bit pattern modification module comprises:
    at least one correction pattern generator that generates a correction bit pattern;
    at least one correction management unit that selects to perform a replacement or insertion of the correction bit pattern; and
    at least one multiplexer that performs a replacement or an insertion of the correction bit pattern into the one or more undesirable bit patterns of the incoming traffic stream dependent on a selection by the at least one correction management unit.

11. The system according to claim 1 wherein the transmitter further comprises at least one frame synchronous scrambler.

12. The system according to claim 1 wherein the pathological pattern detector dynamically defines one or more undesirable bit patterns.

13. A method for correcting pathological patterns in a Frame Synchronous Scrambled network communication, the method comprising:
    receiving an incoming traffic stream, at a receiver;
    detecting an undesirable bit pattern in the incoming traffic stream via a processor; and
    modifying the undesirable bit pattern to produce a modified traffic stream;
    wherein modifying the undesirable bit pattern comprises at least one of:
       generating, by a replacement pattern generator, a bit transition pattern and replacing, by at least one multiplexer, at least a portion of the undesirable bit pattern with the bit transition pattern; and
       generating, by an insertion pattern generator, a bit transition pattern and inserting, by at least one multiplexer, the bit transition pattern into the undesirable bit pattern.

14. A telecommunications system comprising:
    a transmitter comprising:
    a frame synchronous scrambler that scrambles an incoming traffic stream;
    a pattern detector that detects one or more undesirable bit patterns in a scrambled traffic stream;

a bit pattern modification module that modifies the one or more undesirable bit patterns to produce a modified traffic stream; and at least one receiver that receives the modified traffic stream and reverts the modified traffic stream;

wherein the at least one bit pattern modification module provides at least one of:

replaces, by a replacement pattern generator, an original undesirable bit pattern with a replacement bit pattern in the modified traffic stream and wherein the receiver reverts the replacement bit pattern to the original undesirable bit pattern; and inserts, by an insertion pattern generator, an insertion bit pattern into the modified traffic stream and wherein the receiver removes the insertion bit pattern from the modified traffic stream.

* * * * *